United States Patent
Boday et al.

(10) Patent No.: US 8,747,977 B2
(45) Date of Patent: Jun. 10, 2014

(54) MULTILAYER HOSE WITH LEAK PREVENTATIVE INTERFACIAL LAYER CONTAINING SUPER ABSORBENT POLYMER (SAP)

(71) Applicant: International Business Machines Corporation, Armonk, NY (US)

(72) Inventors: Dylan J. Boday, Tucson, AZ (US); Joseph Kuczynski, Rochester, MN (US); Jason T. Wertz, Wappingers Falls, NY (US); Jing Zhang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 13/623,386

(22) Filed: Sep. 20, 2012

(65) Prior Publication Data

US 2014/0076524 A1    Mar. 20, 2014

(51) Int. Cl.
*B29C 47/00* (2006.01)
*F16L 11/00* (2006.01)
*F16L 11/08* (2006.01)

(52) U.S. Cl.
CPC ................ *F16L 11/00* (2013.01); *F16L 11/085* (2013.01)
USPC ........................ 428/36.9; 138/137

(58) Field of Classification Search
CPC ................ F16L 11/085; F16L 2011/04
USPC ........................ 428/36.9; 138/137
See application file for complete search history.

(56) References Cited

U.S. PATENT DOCUMENTS

| 4,487,707 | A | 12/1984 | Holzknecht |
| 6,033,769 | A | 3/2000 | Brueggemann et al. |
| 6,051,317 | A | 4/2000 | Brueggemann et al. |
| 6,446,671 | B2 | 9/2002 | Armenia et al. |
| 7,127,902 | B1 | 10/2006 | Levy |

(Continued)

FOREIGN PATENT DOCUMENTS

WO    2008124889 A1    10/2008

OTHER PUBLICATIONS

Wikipedia contributors, "Superabsorbent polymer", Wikipedia, The Free Encyclopedia, http://en.wikipedia.org/w/index.php?title=Superabsorbent_polymer&oldid=491998395 (accessed Aug. 15, 2012).

(Continued)

*Primary Examiner* — N. Edwards
(74) *Attorney, Agent, or Firm* — Matthew J. Bussan

(57) ABSTRACT

A multilayer hose is provided with a leak preventative interfacial layer that includes a super absorbent polymer (SAP) interposed between an inner layer and an outer layer. In one embodiment, the inner and outer layers are made of ethylene propylene diene monomer (M-class) (EPDM) rubber, and the interfacial layer is covalently bonded to the inner layer (and, optionally, to the outer layer) via a curing reaction between the EPDM rubber of at least the inner layer and a vinyl functionalized reaction product of alginic acid and acryloyl chloride of the interfacial layer. In addition, a reinforcement layer (e.g., textile filaments braided, knitted, or spirally wound onto the interfacial layer) is disposed between the inner and outer layers. In some embodiments, one or more SAP-equipped multilayer hoses interconnect liquid-coolant cooling system components (e.g., cold plates, headers, manifolds, pumps, reservoirs, and heat exchangers) of an apparatus that removes heat from electronic components.

7 Claims, 6 Drawing Sheets

(56) References Cited

U.S. PATENT DOCUMENTS

| | | |
|---|---|---|
| 7,762,332 B2 | 7/2010 | Lopez et al. |
| 8,087,430 B1 | 1/2012 | Betz et al. |
| 8,136,596 B2 | 3/2012 | Lopez et al. |
| 2002/0039869 A1 | 4/2002 | Achille |
| 2003/0207954 A1 | 11/2003 | Hermann et al. |
| 2004/0059054 A1 | 3/2004 | Lopez et al. |
| 2007/0167542 A1 | 7/2007 | Lopez et al. |
| 2008/0163631 A1 | 7/2008 | Campbell et al. |
| 2009/0213541 A1 | 8/2009 | Butterbaugh et al. |
| 2010/0233375 A1 | 9/2010 | Lopez et al. |
| 2012/0118534 A1 | 5/2012 | Goth et al. |
| 2012/0199237 A1* | 8/2012 | Oyaizu et al. .................. 138/137 |
| 2013/0151154 A1* | 6/2013 | Nutley et al. ..................... 702/6 |

OTHER PUBLICATIONS

"CABLOC(R) Absorbent Polymers—Water Blocking Solutions for the Wire & Cable Industry", printed from <www.komdata.net/hm103/0302/KOMDATA/assets/Cabloc_e.pdf> on Aug. 23, 2012.

"Evonik Industries—CABLOC(R) Products", printed from <http://www.creasorb.com/product/creasorb/en/products/cabloc/product-information/pages/default.aspx> on Aug. 15, 2012.

"Evonik Industries—Applications", printed from <http://www.creasorb.com/product/creasorb/en/products/cabloc/applications/pages/default.aspx> on Aug. 23, 2012.

Clyburn, Clinton E. III, "Long-Term Stability of Superabsorbent Gel for Cable Water-blocking Performance", printed from <http://iwcs.omnibooksonline.com/data/papers/2010/6_2.pdf> on Aug. 15, 2012.

"Time-Tested Technology for the most exacting standards—Hose extrusion lines", printed from <http://www.kraussmaffei.com/files_db/1294495320_99_15.pdf> on Aug. 23, 2012.

U.S. Appl. No. 12/869,937, to Boday et al., entitled "Flexible-To-Rigid Tubing", filed Aug. 27, 2010, assigned to International Business Machines Corporation.

* cited by examiner

MULTILAYER HOSE WITH LEAK PREVENTATIVE INTERFACIAL LAYER CONTAINING SUPER ABSORBENT POLYMER (SAP)

BACKGROUND OF THE INVENTION

1. Field of Invention

The present invention relates in general to the field of electronic packaging. More particularly, the present invention relates to a cooling apparatus that removes heat from one or more electronic components using a liquid-cooled cooling plate assembly in fluid communication with one or more multilayer hoses each having a leak preventative interfacial layer containing a super absorbent polymer (SAP). The present invention also relates to a SAP-equipped multilayer hose for use with liquid-cooled cooling plate assemblies and other applications.

2. Background Art

Electronic components, such as microprocessors and integrated circuits, must operate within certain specified temperature ranges to perform efficiently. Excessive temperature degrades electronic component functional performance, reliability, and life expectancy. Heat sinks are widely used for controlling excessive temperature. Typically, heat sinks are formed with fins, pins or other similar structures to increase the surface area of the heat sink and thereby enhance heat dissipation as air passes over the heat sink. In addition, it is not uncommon for heat sinks to contain high performance structures, such as vapor chambers and/or heat pipes, to enhance heat spreading into the extended area structure. Heat sinks are typically formed of highly conductive metals, such as copper or aluminum. More recently, graphite-based materials have been used for heat sinks because such materials offer several advantages, such as improved thermal conductivity and reduced weight.

High performance computer systems have rapidly migrated toward liquid cooling solutions to effectively remove the massive heat load from the CEC, or central electronics complex. Typically, the CEC of a high performance computer system includes CPUs, RAM and other electronic components that generate copious amounts of heat. Heat is removed from one or more electronic components in the CEC of high performance computer systems using a cooling plate assembly through which a liquid-coolant flows. The design of such systems typically calls for flexible tubing incorporating a large number of connections to one or more liquid-cooled cooling plates (also referred to as "cold plates" and "liquid-cooled heat sinks").

SUMMARY OF THE INVENTION

According to some embodiments of the present invention, a multilayer hose is provided with a leak preventative interfacial layer that includes a super absorbent polymer (SAP) interposed between an inner layer and an outer layer. The inner and outer layers are made of ethylene propylene diene monomer (M-class) (EPDM) rubber, and the interfacial layer is covalently bonded to the inner layer (and, optionally, to the outer layer) via a curing reaction between the EPDM rubber of at least the inner layer and a vinyl functionalized reaction product of alginic acid and acryloyl chloride of the interfacial layer. In addition, a reinforcement layer (e.g., textile filaments braided, knitted, or spirally wound onto the interfacial layer) is disposed between the inner and outer layers. In some embodiments, one or more SAP-equipped multilayer hoses interconnect liquid-coolant cooling system components (e.g., cold plates, headers, manifolds, pumps, reservoirs, and heat exchangers) of a cooling apparatus that removes heat from one or more electronic components.

BRIEF DESCRIPTION OF THE DRAWINGS

The preferred exemplary embodiments of the present invention will hereinafter be described in conjunction with the appended drawings, where like designations denote like elements.

DETAILED DESCRIPTION OF THE PREFERRED EMBODIMENTS

1. Overview

In accordance with some embodiments of the present invention, a multilayer hose is provided with a leak preventative interfacial layer that includes a super absorbent polymer (SAP) interposed between an inner layer and an outer layer. The inner and outer layers are made of ethylene propylene diene monomer (M-class) (EPDM) rubber, and the interfacial layer is covalently bonded to the inner layer (and, optionally, to the outer layer) via a curing reaction between the EPDM rubber of at least the inner layer and a vinyl functionalized reaction product of alginic acid and acryloyl chloride of the interfacial layer. In addition, a reinforcement layer (e.g., textile filaments braided, knitted, or spirally wound onto the interfacial layer) is disposed between the inner and outer layers. In some embodiments, one or more SAP-equipped multilayer hoses interconnect liquid-cooled cooling system components (e.g., cold plates, headers, manifolds, pumps, reservoirs, and heat exchangers) of a cooling apparatus that removes heat from one or more electronic components.

2. Detailed Description

In an electronic system having a plurality of processor or server nodes, it is not uncommon to include flexible plastic or rubber tubing connected to coolant inlet and outlet fittings of liquid-cooled cold plates and other components in the coolant system such as coolant supply and return headers, coolant supply and return manifolds, coolant pumps, coolant reservoirs, and/or heat exchangers. However, restrictions on the tubing material choice present a challenge to ensure adequate product reliability. Because such designs bring liquid cooling inside nodes, adequate reliability becomes a must to prevent catastrophic failure of electronic components.

Figure 1:
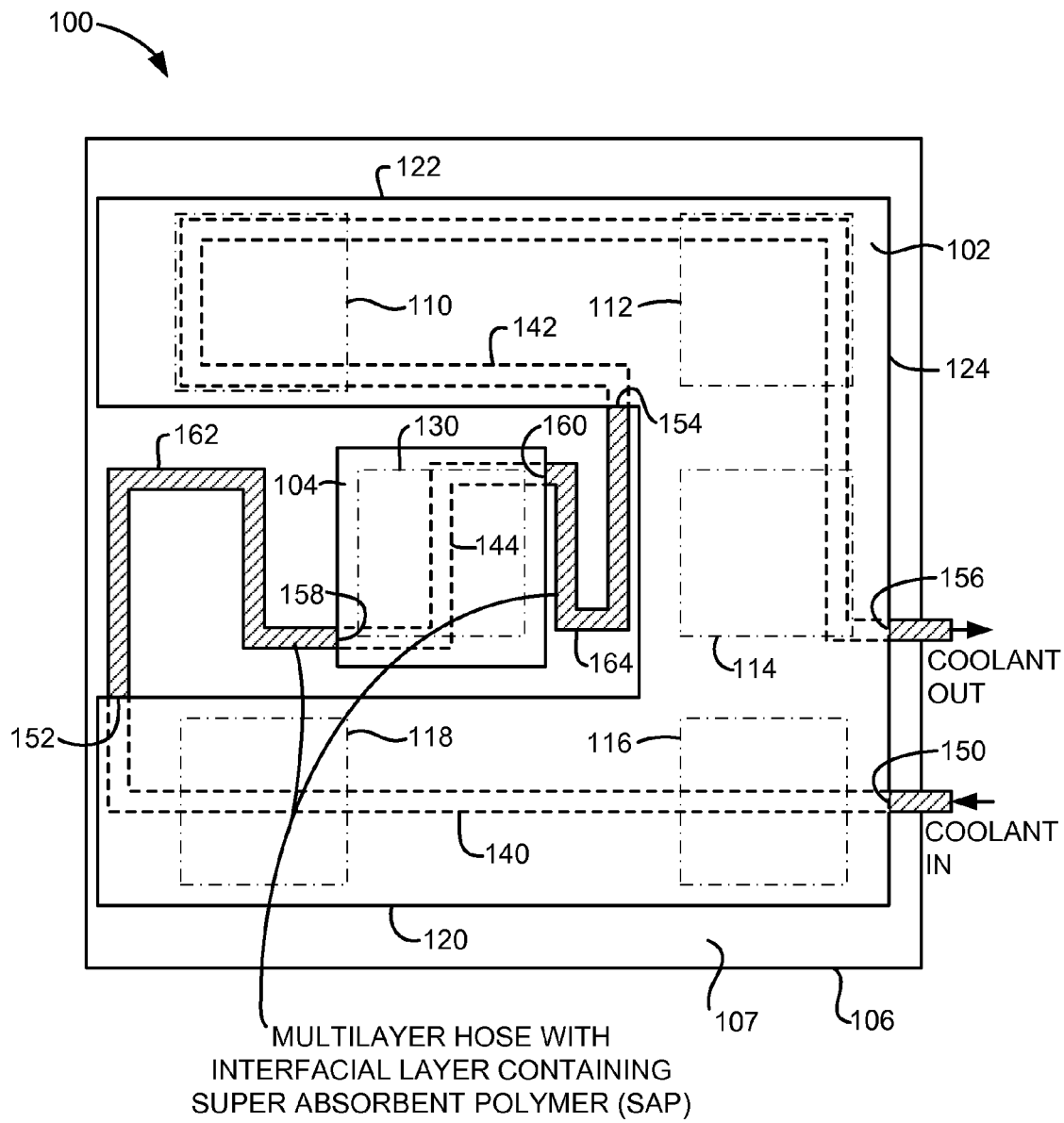
FIG. 1 is a top plan view of a cooling plate assembly having multilayer hoses each with a leak preventative interfacial layer containing a super absorbent polymer (SAP) according to some embodiments of the present invention.

Referring now to FIG. 1, there is depicted, in a top plan view, a cooling plate assembly 100 that utilizes one or more multilayer hoses 162 and 164 each with a leak preventative interfacial layer containing a super absorbent polymer (SAP) in accordance with some embodiments of the present invention. In the embodiment shown in FIG. 1, the SAP-equipped multilayer hoses 162 and 164 interconnect a fixed-gap cooling plate 102 (also referred to herein as a "fixed-gap coldplate") and an articulated cooling plate 104 (also referred to herein as an "articulated coldplate" or a "floating coldplate"). The embodiment shown in FIG. 1 employs a combination of a fixed-gap coldplate and an articulated coldplate. This particular type of cooling plate assembly is shown in FIG. 1 for the purpose of illustrating an exemplary application of the present invention. One skilled in the art will appreciate that a SAP-equipped multilayer hose in accordance with the present invention may be utilized in other cooling plate assemblies (e.g., a cooling plate assembly employing multiple articulated-gap cold plates) and other applications (e.g., manifold-to-node fluid connect hoses 553 and node-to-manifold fluid connect hoses 551 in a liquid-cooled electronics rack 600, shown in FIGS. 5 and 6).

With the exception of the SAP-equipped hoses 162 and 164, the cooling plate assembly 100 shown in FIG. 1 is conventional. Specifically, the cooling plate assembly 100 is a modified-version of the cooling plate assembly disclosed in U.S. Patent Application Publication 2009/0213541 A1, published Aug. 27, 2009, entitled "COOLING PLATE ASSEMBLY WITH FIXED AND ARTICULATED INTERFACES, AND METHOD FOR PRODUCING SAME", assigned to the same assignee as the present application, and hereby incorporated herein by reference in its entirety. In the prior art, the flexible tubes used to interconnect the fixed-gap coldplate and the articulated coldplate are typically made of a high thermal conductivity material, such as copper, aluminum, stainless steel, or other metal. Such conventional flexible tubes are each typically fabricated from low modulus metal tubing (e.g., 5-10 mm diameter copper tubing) that is bent to form a free-expansion loop. The free-expansion loop increases the length of the tube and thereby enhances the tube's flexibility as compared to a shorter, more directly routed tube. The free-expansion loop enhances the ability of the tube to accommodate relative movement between the cooling plates (e.g., during attachment of the cooling plates to the printed circuit board) while imparting a relatively low reaction force in response to that relative movement. Typically, brazing is utilized in connecting the conventional flexible tubes to the cooling plates. Unfortunately, the cost of such conventional flexible tubes can be prohibitive in light of the expense of the metal material, the metal bending process used to form the free-expansion loop, and the brazing process used for connection.

Another solution is to achieve the requisite flexibility by reducing the tubing wall strength (e.g., using a polymer tubing material rather than a metal tubing material). Heretofore, this solution achieved the requisite flexibility but only at the expense of sacrificing burst strength. It is desirable, however, to be able to maintain tubing flexibility without sacrificing burst strength. The tubing material must generally satisfy four requirements: flexibility (determined as the minimum bend radius prior to kinking), burst strength, flammability, and vapor transmission rate. These requirements often conflict with one another.

One solution for making flexible tube interconnects possessing the requisite flexibility and burst strength is to use a conventional multilayer extruded hose provided with one or more reinforcement layers. Generally, the reinforcement material is composed of metallic or textile filaments that are converted into a braided, knitted or spiral-type fabric. However, while the addition of one or more reinforcement layers to a conventional multilayer extruded hose improves burst strength, adequate reliability is not achieved for use with liquid-cooled cooling plate assemblies. For example, in a conventional multilayer extruded hose with a reinforcement layer provided between an inner layer and an outer layer, a coolant that leaks through a discontinuity in the inner layer tends to flow through the interface between the inner layer and the outer layer until the coolant encounter a discontinuity in the outer layer or a connector at an end of the hose. Such leak mechanisms can lead to catastrophic failure of electronic components. For example, leaking coolant may contact one or more electronic components causing the one or more electronic components to short out, or leaking coolant may cause one or more electronic components to overheat as the efficiency of the coolant system is compromised over time due to depletion of the amount of coolant contained in the coolant system (i.e., the amount of coolant contained in the coolant system typically is finite and, hence, depleted by leaking coolant).

A multilayer hose provided with a reinforcement layer and a leak preventative interfacial layer containing a super absorbent polymer (SAP) in accordance with some embodiments of the present invention solves this problem. The interfacial layer containing a SAP prevents, either by material swelling or hydrophobic repulsion, the coolant from traveling through the hose structure if a liquid-coolant incursion into the interfacial layer occurs from a discontinuity in the inner layer. SAPs are typically hydrophilic and "water-swellable". That is, a SAP swells to many times its own volume as it absorbs many times its own weight in water.

The flexibility of tubing is typically measured as the minimum bend radius prior to kinking. For example, an exemplary SAP-equipped multilayer hose having an outside diameter (O.D.) of ¼ inch and a wall thickness of 1/16 inch, may have a flexibility (minimum bend radius) of 1 inch. The burst strength of tubing is typically measured as a maximum working pressure at a given temperature. For example, the exemplary SAP-equipped multilayer hose having an outside diameter (O.D.) of ¼ inch and a wall thickness of 1/16 inch, may have a burst strength (maximum working pressure) of 60 PSI at 160° F. The particular parameter values set forth in this example are for purposes of illustration, not limitation.

In the embodiment illustrated in FIG. 1, the fixed-gap cooling plate 102 is "fixedly" mounted to a printed circuit board (PCB) 106 using a relatively thick compliant thermal interface material, while the articulated cooling plate 104 is gimbal-mounted to the PCB 106 using a relatively high performance interface with low thickness and high contact pressure provided by a spring loading mechanism. One or more electronic components to be cooled by the fixed-gap cooling plate 102 is/are mounted on the top surface 107 of the PCB 106, as is one or more electronic components to be cooled by the articulated cooling plate 104.

In the embodiment shown in FIG. 1, the fixed-gap cooling plate 102 provides cooling for electronic components 110, 112, 114, 116 and 118 (shown as phantom lines in FIG. 1), which may be lower power components, such as low power processors, field programmable gate arrays (FPGAs), memory arrays, modules with one or more chips, and the like. In the embodiment shown in FIG. 1, the fixed-gap cooling plate 102 has a generally U-shaped configuration that includes two leg portions 120, 122 each extending from a base portion 124. One skilled in the art will appreciate that the configuration of the fixed-gap cooling plate 102 shown in FIG. 1 is exemplary and that a fixed-gap cooling plate may be configured to have any shape. Likewise, a fixed-gap cooling plate may provide cooling for any number and any type of electronic components. Typically, the electronic components cooled by the fixed-gap cooling plate 102 have relatively low power dissipation as compared to the relatively high power dissipation of the one or more electronic components cooled by the articulated cooling plate 104, i.e., electronic component 130.

The electronic components cooled by the fixed-gap cooling plate 102 are typically in thermal contact with the fixed-gap cooling plate 102 through a compressive pad thermal interface material (TIM) (not shown). The compressive pad TIM may be a re-usable elastomerically conformable type, or it may be pre-cured or, alternatively, may be cured in-situ. For example, the compressive pad TIM may be provided by mixing a multi-part liquid material and then applying the mixture to the fixed-gap cooling plate 102 and/or the electronic components. An example of a suitable composition for the compressive pad TIM is a fiberglass reinforced, thermally conductive silicone gel pad (commercially available from Dow Corning Corporation, Midland, Mich.).

In the embodiment shown in FIG. 1, the articulated cooling plate 104 has a substantially rectangular configuration and is substantially surrounded by the fixed-gap cooling plate 102. That is, the articulated cooling plate 104 is positioned between the leg portions 120, 122 of the fixed-gap cooling plate 102 and adjacent the base portion 124 of the fixed-gap cooling plate 102. One skilled in the art will appreciate that the configuration of the articulated cooling plate 104 is exemplary, as is the positioning of the articulated cooling plate 104 relative to the fixed-gap cooling plate 102, and that an articulated cooling plate may be configured to have any shape and position relative to the fixed-gap cooling plate. The articulated cooling plate 104 typically provides cooling for a high power electronic component 130 (shown as phantom lines in FIG. 1), which is typically a high power processor, a module with one or more high power processor chips, and the like having a relatively high power dissipation. One skilled in the art will appreciate that an articulated cooling plate may provide cooling for any number and any type of electronic components.

In the embodiment shown in FIG. 1, a single coolant channel connects the fixed-gap cooling plate to the articulated cooling plate. In the embodiment shown in FIG. 1, the fixed-gap cooling plate 104 includes thermal dissipation channels 140 and 142, while the articulated cooling plate 106 includes a thermal dissipation channel 144. The thermal dissipation channel 140 extends through a lower-side (as viewed in FIG. 1) of the fixed-gap cooling plate 102 from an inlet port 150 at the base portion 124 to an outlet port 152 at the leg portion 120. The thermal dissipation channel 142 extends through an upper-side (as viewed in FIG. 1) of the fixed-gap cooling plate 102 from an inlet port 154 at the leg portion 122 to an outlet port 156 at the base portion 124. The thermal dissipation channel 144 extends through the articulated cooling plate 104 from an inlet port 158 to an outlet port 160.

In the embodiment shown in FIG. 1, a SAP-equipped multilayer hose 162 interconnects the outlet port 152 of the thermal dissipation channel 140 of the fixed-gap cooling plate 102 to the inlet port 158 of the thermal dissipation channel 144 of the articulated cooling plate 104. Similarly, a SAP-equipped multilayer hose 164 interconnects the outlet port 160 of the thermal dissipation channel 144 of the articulated cooling plate 104 to the inlet port 154 of the thermal dissipation channel 142 of the fixed-gap cooling plate 102. In accordance with the some embodiments of the present invention, the SAP-equipped multilayer hoses 162 and 164 are sufficiently flexible to allow the hoses to be readily routed between and connected to the input and output ports of the cooling plates 102 and 104.

In the embodiment shown in FIG. 1, the SAP-equipped multilayer hoses 162 and 164 are routed to form a free-expansion loop. The free-expansion loop increases the length of the hose and thereby enhances the hose's flexibility as compared to a shorter, more directly routed hose. The free-expansion loop enhances the ability of the hose to accommodate relative movement between the cooling plates while imparting a relatively low reaction force in response to that relative movement.

The SAP-equipped hoses 162 and 164 may have any suitable inside diameter (ID) and outside diameter (OD). For example, the SAP-equipped hoses 162 and 164 each may be fabricated to have a standard inside diameter (e.g., ¼ inch, ⅜ inch, etc.).

The SAP-equipped multilayer hoses 162 and 164 may be connected to the fixed-gap cooling plate 102 and the articulated cooling plate 104 using any suitable conventional fastening technique. For example, conventional barbed insert fittings may be used. Single barb insert fittings, for instance, have a land behind the barb that allows a clamp to be fastened over the hose. In any event, the fastening technique preferably also serves to effectively seal the hoses relative to the cooling plates to prevent coolant leaks.

The single barb insert fitting is an example of a suitable conventional fastening technique that may be utilized in connecting the SAP-equipped multilayer hoses to the cooling plates. For example, four single barb insert fittings (not shown) may be inserted and sealed into the outlet port 152 of the fixed-gap cooling plate 102, the inlet port 158 of the articulated cooling plate 104, the outlet port 160 of the articulated cooling plate 104, and the inlet port 154 of the fixed-gap cooling plate 102 using conventional techniques. Then, the ends of the SAP-equipped multilayer hose 162 may be slid over and in turn clamped to (e.g., by tightening a clamp over each end of the hose) two single barb insert fittings respectively provided on the outlet port 152 of the thermal dissipation channel 140 of the fixed-gap cooling plate 102 and the inlet port 158 of the thermal dissipation channel 144 of the articulated cooling plate 104. Similarly, the ends of the SAP-equipped multilayer hose 164 may be slid over and in turn clamped to (e.g., by tightening a clamp over each end of the tube) two single barb insert fittings respectively provided on the outlet port 160 of the thermal dissipation channel 144 of the articulated cooling plate 104 and the inlet port 154 of the thermal dissipation channel 142 of the fixed-gap cooling plate 102.

Typically, the fixed-gap cooling plate 102 and the articulated cooling plate 104 are made of a high thermal conductivity material, such as copper, aluminum, stainless steel, or other metal. In some embodiments, the fixed-cooling plate 102 and/or the articulated cooling plate 104 may be made of silicon (e.g., single-crystal silicon or polycrystalline silicon) to match the coefficient of thermal expansion of the silicon chips being cooled.

The fixed-gap cooling plate 102 and the articulated cooling plate 104 may have a multi-part construction to facilitate the formation of the thermal dissipation channels 140, 142 and 144. For example, each of the cooling plates may be constructed by joining a top plate to a bottom plate, at least one of which has at least a portion of one or more thermal dissipation channels formed on a surface thereof at the interface between top plate and the bottom plate. The top plate and the bottom plate may be joined together using any suitable conventional fastening technique such as brazing, soldering, diffusion bonding, adhesive bonding, etc. For example the top plate may be bonded to the bottom plate using a silver filled epoxy, filled polymer adhesive, filled thermoplastic or solder, or other thermally conductive bonding material. The fastening technique preferably also serves to effectively seal the plates together to prevent coolant leaks.

The thermal dissipation channels may be formed on the surface of either or both the top plate and the bottom plate by any suitable conventional technique such as routing, sawing or other milling technique, or by etching.

In lieu of a multi-part construction, the fixed-gap cooling plate 102 and/or the articulated cooling plate 104 may have a one-piece construction. For example, the thermal dissipation channels may be formed in the fixed-gap cooling plate 102 and/or the articulated cooling plate 104 through a milling operation (e.g., drilling).

Figure 2:
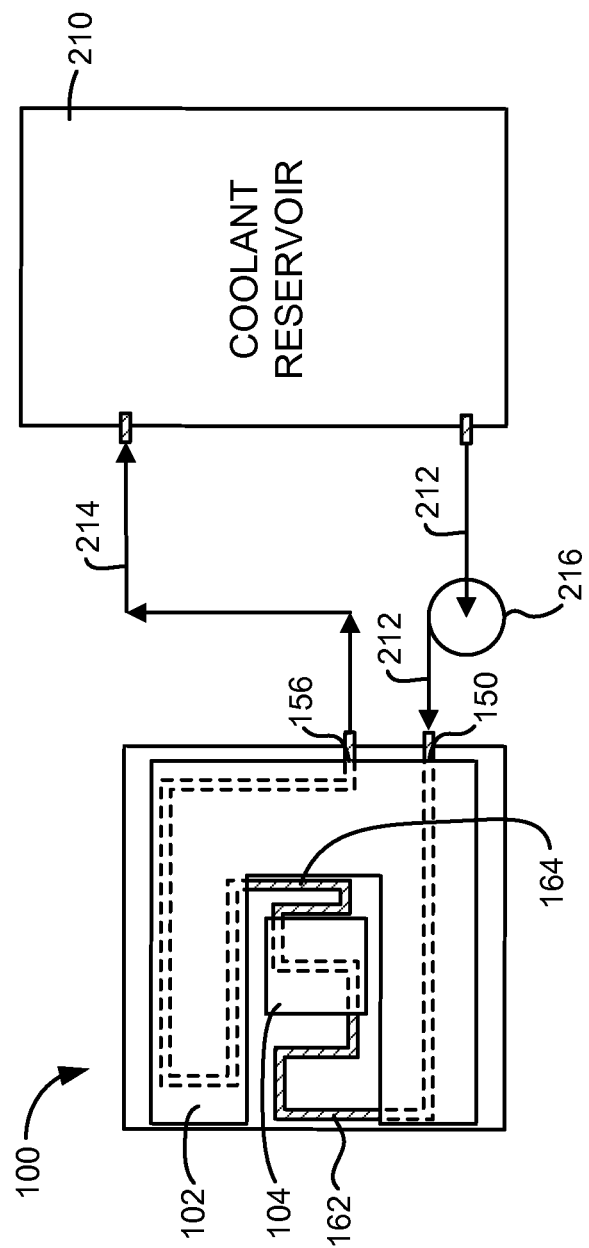
FIG. 2 is a top plan view of a cooling plate assembly having a fixed-gap cooling plate and an articulated cooling plate interconnected with SAP-equipped multilayer hoses and in fluid communication with a coolant reservoir according to some embodiments of the present invention.

FIG. 2 is a top plan view of a cooling plate assembly 100 having a fixed-gap cooling plate 102 and an articulated cooling plate 104 interconnected with SAP-equipped multilayer hoses 162 and 164 and in fluid communication with a reservoir 210 containing cooling fluid according to some embodiments of the present invention. A cooling fluid is preferably pumped from coolant reservoir 210 through a supply conduit 212 to inlet port 150 of the cooling plate assembly 100, where the cooling fluid picks up heat as it travels through thermal dissipation channels of the fixed-gap cooling plate 102 and the articulated cooling plate 104. Then, the cooling fluid is exhausted from outlet port 156 of the cooling plate assembly 100 through an exhaust conduit 214 and returns to thermal reservoir 210. A pump 216 is preferably provided to force the cooling fluid through the recirculation loop. Prior to recirculating the cooling fluid through the recirculation loop, it may be desirable to cool the cooling fluid. For example, the cooling fluid may be cooled in the reservoir or elsewhere using a heat exchanger, waterfall, radiator, or other conventional cooling mechanism. The cooling fluid may be any suitable coolant, for example, an inert perfluorocarbon fluid, such as 3M Fluorinert™ commercially available from 3M Company, St. Paul, Minn. Other suitable coolants include, but are not limited to, water, ethylene glycol, ethylene glycol/water mixture, polyalphaolefin (PAO), ammonia, methanol, nitrogen, and the like.

Supply conduit 212 and exhaust conduit 214 are respectively attached to inlet port 150 and outlet port 156 of the cooling plates assembly 100 using any suitable conventional fastening technique, such as by inserting and sealing tubular fittings into inlet port 150 and outlet port 156, and then mating supply conduit 212 and exhaust conduit 214 over the tubular fittings to provide a tight seal. Supply conduit 212 and exhaust conduit 214 may be rubber, metal or some other suitable material that is compatible with the coolant. The supply conduit 212 and/or the exhaust conduit 214 may be SAP-equipped multilayer hoses.

In general, the rate of heat transfer can be controlled by using various thermal transport media in the internal structure of the cooling plate assembly 100. For example, the rate of heat transfer can be controlled by varying the composition and/or the flow rate of the cooling fluid. Also, the rate of heat transfer is a function of the configuration of the thermal dissipation channels within the cooling plate assembly 100.

Figure 3:
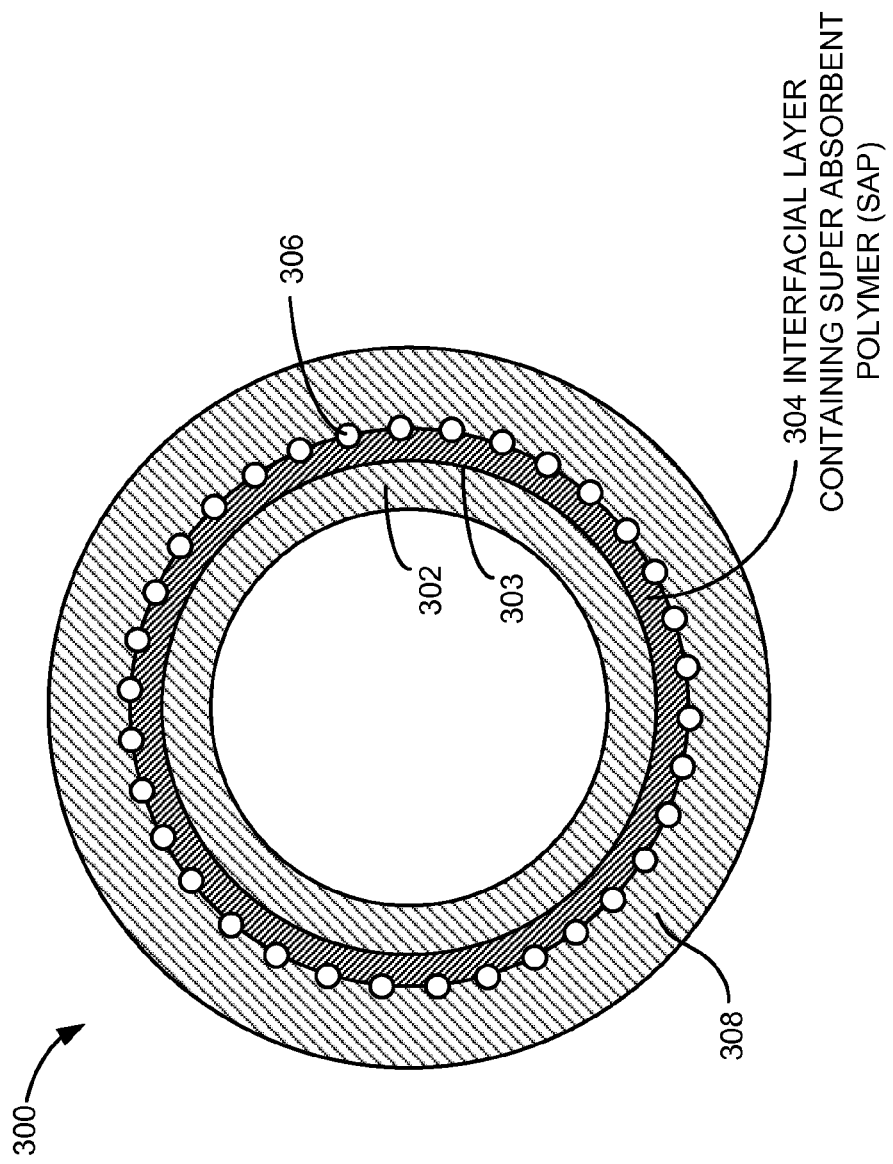
FIG. 3 is cross-sectional view of a multilayer hose with a leak preventative interfacial layer containing a SAP according to some embodiments of the present invention.

FIG. 3 is cross-sectional view of a multilayer hose 300 with a leak preventative interfacial layer containing a SAP according to some embodiments of the present invention. The SAP-equipped multilayer hose 300 shown in FIG. 3 may correspond to one or more of the SAP-equipped multilayer hoses 162 and 164 shown in FIGS. 1 and 2, as well as one or more of the SAP-equipped multilayer hoses 551 and 553 shown in FIGS. 5 and 6. In the embodiment illustrated in FIG. 3, the SAP-equipped multilayer hose 300 includes an inner layer 302, an interfacial layer 304 containing a SAP, a reinforcement layer 306, and an outer layer 308.

A method for producing the multilayer hose 300 shown in FIG. 3 is described in detail below with reference to FIG. 4. However, a brief overview of a method for producing the multilayer hose 300 is provided at this point to aid in understanding certain structural characteristics of the multilayer hose 300. Initially, the inner layer 302 is extruded onto a mandrel and partially cured. Next, the interfacial layer 304 is formed by applying a SAP on top of an outside surface 303 of the partially cured inner layer 302. The reinforcement layer 306 is then formed by braiding, knitting, or spirally winding one or more textile filaments on top of the assembly of the inner layer 302/interfacial layer 304. Then, the outer layer 308 is extruded on top of the assembly of the inner layer 302/interfacial layer 304/reinforcement layer 306 to form a multilayer hose assembly. Finally, the multilayer hose assembly (i.e., the assembly of the inner layer 320/interfacial layer 304/reinforcement layer 306/outer layer 308) is cured. In some embodiments of the present invention, the SAP of the interfacial layer 304 is tailored (e.g., vinyl functionalized) to covalently attach to the inner layer 302 (and, optionally, to the outer layer 308) as the multilayer hose assembly is cured.

In the embodiment shown in FIG. 3, the inner layer 302 and the outer layer 308 are each made of ethylene propylene diene monomer (M-class) (EPDM) rubber. In the acronym "EPDM", the "E" refers to ethylene, the "P" refers to propylene, the "D" refers to diene, and the "M" refers to this rubber's classification in ASTM standard D-1418. The M-class includes rubbers having a saturated chain of the polymethylene type. EPDM rubber is an industry standard material for making flexible multilayer extruded hose. However, one skilled in the art will appreciate that other materials may be used in lieu of EPDM rubber to fabricate the inner layer 302 and/or the outer layer 308 in accordance with the present invention and that this embodiment is not limiting. Moreover, the composition of the inner layer 302 need not be the same as the composition of the outer layer 308. In general, concepts of the present invention are broadly applicable to any multilayer hose construction. Suitable compositions for the inner layer 302 and/or the outer layer 308 include, but are not limited to, EPDM, nitrile butadiene rubber (NBR), styrene-butadiene rubber (SBR), fluorinated polymers (e.g., fluorinated ethylene propylene (FEP)), and plasticized PVC (e.g., plasticized PVC tubing with the tradename Tygon® is available from Saint-Gobain Performance Plastics Corporation). One skilled in the art will appreciate, however, that the chemistry of the SAP typically needs to be tailored to covalently bind, in accordance with some embodiments of the present invention, to these other polymer classes.

The inner layer 302 and the outer layer 308 are fabricated using conventional procedures well known to those skilled in the art. For example, the inner layer 302 and the outer layer 308 may be extruded using conventional extrusion processes. Such conventional extrusion processes are also used in the production of conventional fabric-reinforced hoses. The inner layer 302 may be, for example, extruded onto a mandrel using a conventional extruder with a straight die and a diameter measuring device. A straight die is a conventional extrusion die for hose production. The outer layer 308 may be, for example, extruded onto the assembly of the inner layer 302/interfacial layer 304/reinforcement layer 306 using a conventional extruder with a vacuum zone, a crosshead die, and a diameter measuring device. A crosshead die is a conventional extrusion die for hose sheathing.

In the embodiment shown in FIG. 3, the interfacial layer 304 is covalently bonded to the inner layer 302 (and, optionally, to the outer layer 308) via a curing reaction between a vinyl functionalized reaction product of alginic acid and acryloyl chloride of the interfacial layer and the EPDM rubber of the inner layer 302 (and, optionally, the outer layer 308). Alginic acid is a conventional SAP and is capable of absorbing 200-300 times its own weight in water. In this particular embodiment, alginic acid is vinyl functionalized through a catalyzed reaction with acryloyl chloride so that the interfacial layer 304 (composed of the vinyl functionalized reaction product) becomes covalently bonded to the inner layer 302 (and, optionally, to the outer layer 308) when the multilayer hose assembly is cured. The catalyzed reaction used in this particular embodiment is set forth in Reaction Scheme 1 below.

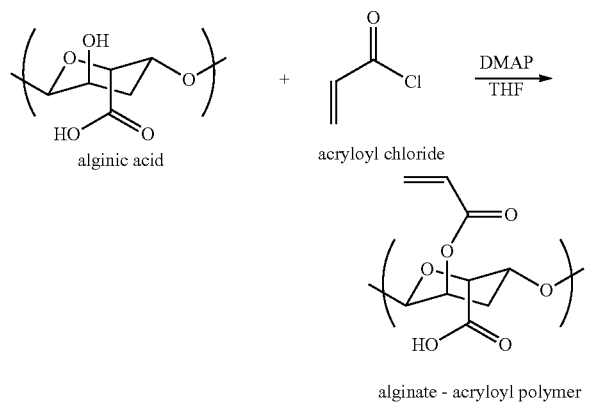

Reaction Scheme 1

Reaction scheme 1 is performed at room temperature using conventional procedures well known in the art. In Reaction Scheme 1, alginic acid (CAS number 9005-32-5), acryloyl chloride (CAS number 814-68-6), and 4-Dimethylaminopyridine (DMAP) (CAS number 1122-58-3) are dissolved in tetrahydrofuran (THF) (CAS number 109-99-9). DMAP is utilized as a catalyst, and is typically used at a 20:1 molar ratio (substrate:DMAP). By way of example, Reaction Scheme 1 may be implemented by reacting 1 mM alginic acid, 1 mM acryloyl chloride, and 0.05 mM DMAP in THF. Generally, stoichiometric quantities of the reactants (i.e., alginic acid and acryloyl chloride) may be used. Reaction Scheme 1, which is catalyzed by DMAP, is typically carried out at room temperature (RT) as a one pot reaction under argon (Ar) atmosphere for approximately 12 hours. Reaction Scheme 1 involves 1:1 stoichiometry between the hydroxyl groups of alginic acid (which is molecular weight (MW) dependent, but can be determined via a standard titration method) and the chlorine (Cl) atoms of acryloyl chloride. Any suitable catalyst known to those skilled in the art may be used in lieu of, or in addition to, DMAP. Likewise, any suitable solvent known to those skilled in the art may be used in lieu of, or in addition to, THF.

When the Reaction Scheme 1 is completed, the reaction product may be separated from the solvent using conventional procedures well known in the art. The reaction product may be subsequently re-dissolved in THF or another suitable solvent to form a SAP solution for application onto the inner layer 302. One skilled in the art will appreciate that a suitable concentration of the SAP in this SAP solution will generally vary depending on the application method of choice (e.g., dipping, spraying, etc.). Typically, a suitable concentration of the SAP in this SAP solution would be empirically determined based on the desired viscosity for the application method of choice. The higher the viscosity, the greater the SAP content in the interfacial layer 304. The interfacial layer 304 is formed by applying the SAP solution onto an outside surface 303 of the inner layer 302. The SAP solution may be applied using any convention technique known in the art such as spraying, dip coating, roll coating, and curtain coating. For example, the SAP solution may be applied onto the outside surface 303 of the inner layer 302 by dipping the inner layer 302 (in a partially cured state) into a dip tank containing the SAP solution. Alternatively, in lieu of separating the reaction product from the solvent, it may be desirable to retain the reaction product within the solvent of Reaction Scheme 1 for direct application onto the outside surface 303 of the inner hose 302.

One skilled in the art will appreciate that other materials may be used in lieu of the vinyl functionalized reaction product of alginic acid and acryloyl chloride to fabricate the interfacial layer 304. In this particular embodiment, the composition of the interfacial layer 304 is tailored so that the SAP becomes covalently attached to the inner layer 302 (and, optionally, to the outer layer 308) when the multilayer hose assembly is cured. Any SAP can be used provided it can be grafted onto the inner layer 302. Generally, covalent attachment of the SAP to the inner layer 302 is preferred because covalent attachment eliminates the creation of an interstitial pathway through which a coolant may tend to flow if not blocked by sufficient material swelling (i.e., coolant ingress through a discontinuity in the inner layer 302, if not sufficiently blocked by swelling of the SAP, may tend to flow through such an interstitial pathway). As noted above, in a conventional multilayer extruded hose with a reinforcement layer provided between an inner layer and an outer layer, a coolant that leaks through a discontinuity in the inner layer tends to flow through the interface between the inner layer and the outer layer until the coolant encounters a discontinuity in the outer layer or a connector at an end of the hose.

Also, crosslinking the SAP to the inner layer 302 (and, optionally, to the outer layer 308) helps to hold the polymer network together, thereby offering more strength and long-term stability for the superabsorbent hydrated gel produced when the SAP encounters coolant ingress from a discontinuity in the inner layer 302.

In lieu of covalent attachment of the SAP to the inner layer 302, noncovalent SAPs can also be used. Suitable noncovalent SAPs include, but are not limited to, sodium polyacrylate, polyacrylamide copolymer, ethylene maleic anhydride copolymer, cross-linked carboxymethylcellulose, polyvinyl alcohol copolymers, cross-linked polyethylene oxide, and starch grafted copolymer of polyacrylonitrile. These polymers are well known in the art and are widely commercially available. Liquid, solvent free, crosslinkable polyacrylates (SAP), as well as traditional crosslinked superabsorbent powders, with the trade name CABLOC® are available from Evonic Degussa GmbH.

Irrespective of whether or not covalent attachment of the SAP to the inner layer 302 is used, the interfacial layer 304 containing a SAP prevents, either by material swelling or hydrophobic repulsion, the coolant from traveling through the hose structure if a liquid-coolant incursion into the interfacial layer 304 occurs from a discontinuity in the inner layer 302.

As noted above, SAPs are generally hydrophilic and "water-swellable". Preferably, the SAP's level of crosslinking in the interfacial layer 304 is selected to give the desired swelling characteristics. SAPs having low cross-link density (i.e., lightly cross-linked) generally have a higher absorbent capacity and swell to a larger degree, but may offer lesser strength and long-term stability. SAPs having high cross-link density (i.e., heavily cross-linked) generally have a lower absorbent capacity and swell to a smaller degree, but generally offer greater strength and long-term stability. The SAP in the interfacial layer 304 must be capable of swelling to an extent sufficient to block water (or other liquid-coolant) ingress from a discontinuity in the inner layer 302 within a suitably short distance from the discontinuity. The superabsorbent hydrated gel produced when the SAP encounters such a water (or other liquid-coolant) ingress must be strong and stable enough to hold the head of water (or other liquid-coolant) and prevent migration of water (or other liquid-coolant) through the interfacial layer 304 (as well as any interstitial pathway created by the interfacial layer 304) over time. Otherwise, degradation of the superabsorbent hydrated gel over time will allow the water (or other liquid-coolant) to penetrate past the blockage and progress further through the multilayer hose 300. The migrating water (or other liquid-coolant) would eventually reach a discontinuity in the outer layer 308 and or a connector (not shown) at the end of the multilayer hose 300, causing a leak and potentially catastrophic failure of electronic components.

In the embodiment shown in FIG. 3, the reinforcement layer 306 is disposed between the inner layer 302 and the outer layer 308. However, one skilled in the art will appreciate that the one or more reinforcement layers may be disposed at any suitable location within the multilayer hose. The reinforcement layer 306 is fabricated using conventional procedures well known to those skilled in the art. For example, the reinforcement layer 306 may be formed by braiding, knitting, or spirally winding one or more metallic or textile filaments on top of the assembly of the inner layer 302/interfacial layer 304. Such conventional procedures are also used in the production of conventional fabric-reinforced hoses. For example, the reinforcement layer 306 may be applied using a conventional braiding machine, a conventional knitting machine, or a conventional spiraling machine. Any suitable conventional textile or metallic filament may be used in the construction of the reinforcement layer 306. Suitable conventional textile filaments include, but are not limited to, nylons (e.g., nylon 6,6; nylon 6,10; and nylon 12,12), polyethylene terephthalate (PET), rayon, and the like. Suitable conventional textile filaments include, but are not limited to, braided steel fabric.

The SAP-equipped multilayer hose 300 shown in FIG. 3 may have any suitable inside diameter (ID) and outside diameter (OD). For example, the SAP-equipped multilayer hose 300 may be fabricated to have a standard inside diameter. That is, the SAP-equipped multilayer hose 300 may be fabricated as ¼-inch hose, ⅜-inch hose, ¾-inch hose, 1-inch hose, etc. Generally, the inner layer 302, the interfacial layer 304, the reinforcement layer 306, and the outer layer 308 of the multilayer hose 300 may have any suitable thickness so long as all requisite hose specifications (e.g., ID, OD, minimum wall thickness (MWT), etc.) are met.

Where ¼-inch hose is desired, for example, the SAP-equipped multilayer hose 300 may have the following hose specifications: ID=6.35 mm with a tolerance of +0.38/−0.25 mm; OD=14.22 mm with a tolerance of +0.38/−0.25 mm; and a MWT=3.05 mm. In this example, the inner layer 302 may have a thickness of approximately 1.53 mm and the outer layer 308 may have a thickness of approximately 1.53 mm. Also, in this example, the interfacial layer 304 containing the SAP may have a thickness of approximately 0.44 mm and the reinforcement layer 306 may have a thickness of approximately 0.44 mm.

Where ⅜-inch hose is desired, for example, the SAP-equipped multilayer hose 300 may have the following specifications: ID=9.53 mm with a tolerance of +0.38/−0.38 mm; OD=17.91 mm with a tolerance of +0.58/−0.58 mm; and a MWT=3.05 mm. In this example, the inner layer 302 may have a thickness of approximately 1.53 mm and the outer layer 308 may have a thickness of approximately 1.53 mm. Also, in this example, the interfacial layer 304 containing the SAP may have a thickness of approximately 0.57 mm and the reinforcement layer 306 may have a thickness of approximately 0.57 mm.

Where ¾-inch hose is desired, for example, the SAP-equipped multilayer hose 300 may have the following specifications: ID=19.05 mm with a tolerance of +0.51/−0.51 mm; OD=28.96 mm with a tolerance of +0.79/−0.58 mm; and a MWT=3.57 mm. In this example, the inner layer 302 may have a thickness of approximately 1.79 mm and the outer layer 308 may have a thickness of approximately 1.79 mm. Also, in this example, the interfacial layer 304 containing the SAP may have a thickness of approximately 0.70 mm and the reinforcement layer 306 may have a thickness of approximately 0.70 mm.

Where 1-inch hose is desired, for example, the SAP-equipped multilayer hose 300 may have the following specifications: ID=25.40 mm with a tolerance of +0.76/−0.76 mm; OD=38.86 mm with a tolerance of +0.76/−0.76 mm; and a MWT=5.59 mm. In this example, the inner layer 302 may have a thickness of approximately 2.80 mm and the outer layer 308 may have a thickness of approximately 2.80 mm. Also, in this example, the interfacial layer 304 containing the SAP may have a thickness of approximately 0.57 mm and the reinforcement layer 306 may have a thickness of approximately 0.57 mm.

Figure 4:
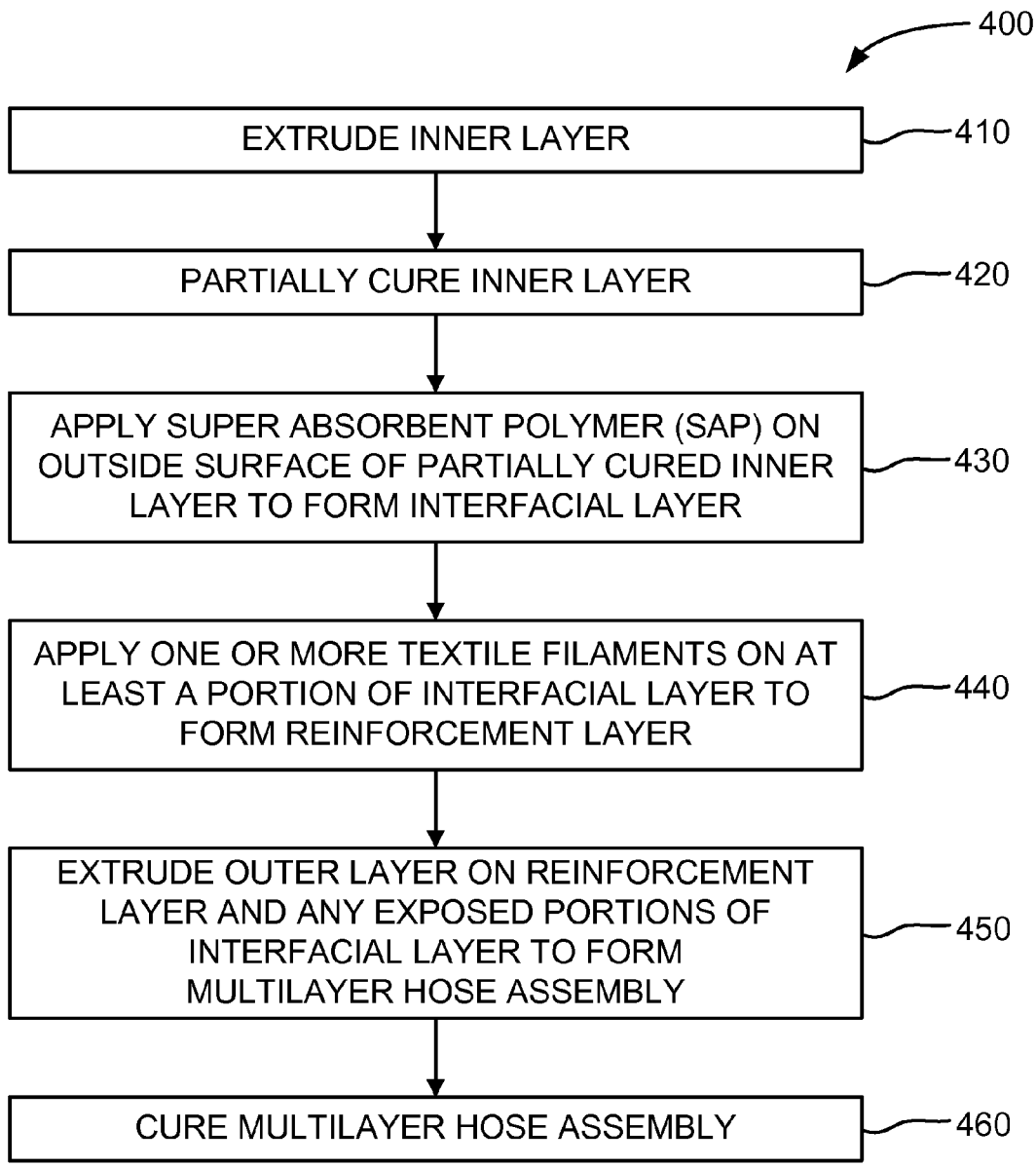
FIG. 4 is a flow diagram of a method for producing a multilayer hose with a leak preventative interfacial layer containing a SAP according to some embodiments of the present invention.

FIG. 4 is a flow diagram of a method 400 for producing a multilayer hose with a leak preventative interfacial layer containing a SAP according to some embodiments of the present invention. The method 400 sets forth the preferred order of the steps. It must be understood, however, that the various steps may occur at any time relative to one another. The method 400 begins by extruding an EPDM rubber inner layer onto a mandrel (step 410). This step is conventional. Such conventional extrusion processes are also used in the production of conventional fabric-reinforced hoses. The inner layer 302 (shown in FIG. 3) may be, for example, extruded onto a mandrel using a conventional extruder with a straight die and a diameter measuring device.

The method 400 continues by partially curing the EPDM rubber inner layer (step 420). The inner layer 302 may be partially cured by, for example, heating the inner layer 302 to a curing temperature for a period of time sufficient to only partially cure the inner layer 302.

Next, the method 400 continues by applying a SAP on top of an outside surface of the partially cured EPDM rubber inner layer to form an interfacial layer (step 430). In accordance with some embodiments to the present invention, the composition of the interfacial layer is tailored (e.g., vinyl functionalized) so that the SAP becomes covalently attached to the EPDM rubber inner layer (and, optionally, to the EPDM rubber outer layer) when the multilayer hose assembly is cured. For example, a SAP solution containing the reaction product of alginic acid and acryloyl chloride may be applied onto the outside surface 303 (shown in FIG. 3) of the partially cured inner layer 302 by dipping the partially cured inner layer 302 into a dip tank containing the SAP solution to form the interfacial layer 304 (shown in FIG. 3). Also in step 430, the interfacial layer formed by application of the SAP is dried to drive off the solvent. One skilled in the art will appreciate that the SAP may be applied either before or after the reinforcement layer is applied.

The method 400 continues by applying one or more textile filaments on at least a portion of the SAP interfacial layer to form the reinforcement layer (step 440). This step uses conventional procedures. In the production of conventional fabric-reinforced hoses, for example, textile filaments are braided, knitted, or spirally wound onto the partially cured inner layer. The reinforcement layer 306 (shown in FIG. 3) may be formed by, for example, using a conventional braiding machine, a conventional knitting machine, or a conventional spiraling machine to braid, knit, or spirally wind one or more textile filaments (e.g., nylon 6,6) on top of the assembly of the inner layer 302/interfacial layer 304. One skilled in the art will appreciate that the reinforcement layer may be applied either before or after the interfacial layer is applied.

The method 400 continues by extruding an EPDM rubber outer layer onto the reinforcement layer and any exposed portions of the interfacial layer to form a multilayer hose assembly (step 450). This step uses conventional extrusion processes. Such conventional extrusion processes are also used in the production of conventional fabric-reinforced hoses. The outer layer 308 (shown in FIG. 3) may be, for example, extruded onto the assembly of the inner layer 302/interfacial layer 304/reinforcement layer 306 using a conventional extruder with a vacuum zone, a crosshead die, and a diameter measuring device. In some embodiments of the present invention, the SAP of the interfacial layer 304 is tailored (e.g., vinyl functionalized) to covalently attach to the inner layer 302 (and, optionally, to the outer layer 308) as the multilayer hose assembly is cured.

The method 400 concludes by curing the multilayer hose assembly (step 460). The multilayer hose assembly (i.e., the assembly of the inner layer 302/interfacial layer 304/reinforcement layer 306/outer layer 308) may be cured by, for example, applying heat and pressure to the multilayer hose assembly. Application of heat and pressure during step 460 covalently bonds the inner layer 302 to the outer layer 308 as well as binds the interfacial layer 304 into the core hose structure. In embodiments of the present invention where the SAP of the interfacial layer 304 is tailored (e.g., vinyl functionalized) to covalently attach to the inner layer 302 (and, optionally, to the outer layer 308) as the multilayer hose assembly is cured, the application of heat and pressure during step 460 covalently bonds the interfacial layer 304 to the inner layer 302 (and, optionally, to the outer layer 308).

Figure 5:
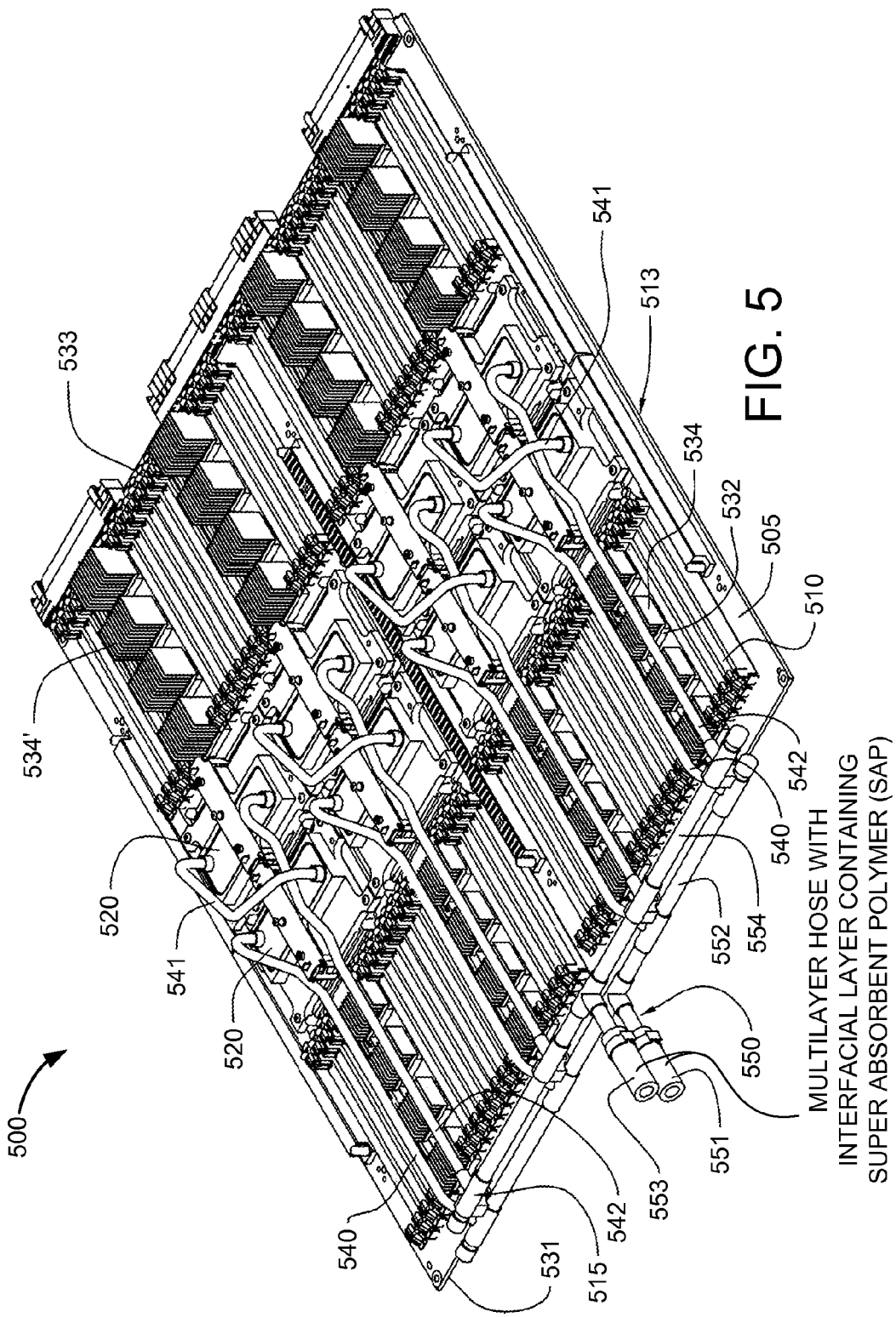
FIG. 5 is an isometric view of a partially assembled electronics drawer layout, wherein an electronic subsystem includes eight heat-generating electronic components to be actively cooled, each heat-generating electronic component having a respective liquid-cooled cold plate of a liquid-based cooling system coupled thereto, and each liquid-cooled cold plate is interconnected through coolant-carrying tubes and a header subassembly to coolant supply and return multilayer hoses each with a leak preventative interfacial layer containing a SAP according to some embodiments of the present invention.

FIG. 5 is an isometric view of a partially assembled electronics drawer layout 500, wherein an electronic subsystem includes eight heat-generating electronic components to be actively cooled, each heat-generating electronic component having a respective liquid-cooled cold plate of a liquid-based cooling system coupled thereto, and each liquid-cooled cold plate is interconnected through coolant-carrying tubes and a header subassembly to coolant supply and return multilayer hoses 551, 553 each with a leak preventative interfacial layer containing a SAP according to some embodiments of the present invention. With the exception of the SAP-equipped hoses 551, 553, the electronics drawer layout 500 shown in FIG. 5 is conventional. Specifically, the electronics drawer layout 500 is a modified-version of the electronics drawer layout disclosed in U.S. Patent Application Publication 2012/0118534 A1, published May 17, 2012, entitled "MULTIMODAL COOLING APPARATUS FOR AN ELECTRONIC SYSTEM", assigned to the same assignee as the present application, and hereby incorporated herein by reference in its entirety.

More particularly, FIG. 5 depicts a partially assembled electronic subsystem 513 and an assembled liquid-based cooling system 515 coupled to primary heat generating components (e.g., including processor dies) to be cooled. In this embodiment, the electronic subsystem is configured for (or as) an electronics drawer of an electronics rack, and includes, by way of example, a support substrate or planar board 505, a plurality of memory module sockets 510 (with the memory modules (e.g., dual in-line memory modules) not shown), multiple rows of memory support modules 532 (each having coupled thereto an air-cooled heat sink 534), and multiple processor modules (not shown) disposed below the liquid-cooled cold plates 520 of the liquid-based cooling system 515.

Liquid-based cooling system 515 comprises (in this embodiment) a preconfigured monolithic structure which includes multiple (pre-assembled) liquid-cooled cold plates 520 configured and disposed in spaced relation to engage respective heat generating electronic components. Each liquid-cooled cold plate 520 includes, in this embodiment, a coolant inlet and a coolant outlet, as well as an attachment subassembly (i.e., cold plate/load arm assembly). Each attachment subassembly is employed to couple its respective liquid-cooled cold plate 520 to the associated electronic component to form the cold plate and electronic component assemblies.

In addition to liquid-cooled cold plates 520, liquid-based cooling system 515 includes multiple coolant-carrying tubes, including coolant supply tubes 540 and coolant return tubes 542 in fluid communication with respective liquid-cooled cold plates 520. The coolant-carrying tubes 540, 542 are also connected to a header (or manifold) subassembly 550 which facilitates distribution of liquid coolant to the coolant supply tubes 540 and return of liquid coolant from the coolant return tubes 542. In this embodiment, the air-cooled heat sinks 534 coupled to memory support modules 532 positioned closer to the front 531 of electronics drawer 513 are shorter in height than the air-cooled heat sinks 534' coupled to memory support modules 532 positioned nearer to the back 533 of electronics drawer 513. This size difference is to accommodate the coolant-carrying tubes 540, 542 since, in this embodiment, the header subassembly 550 is at the front of the electronics drawer and the multiple liquid-cooled cold plates 520 are in the middle of the drawer.

In addition to coolant supply tubes 540 and coolant return tubes 542, in this embodiment, bridge tubes or lines 541 are provided for coupling, for example, a liquid coolant outlet of one liquid-cooled cold plate to the liquid coolant inlet of another liquid-cooled cold plate to connect in series fluid flow the cold plates, with the pair of cold plates receiving and returning liquid coolant via a respective set of coolant supply and return tubes. In one embodiment, the coolant supply tubes 540, bridge tubes 541 and coolant return tubes 542 are each preconfigured, semi-rigid tubes formed of a thermally conductive material, such as copper or aluminum, and the tubes are respectively brazed, soldered or welded in a fluid-tight manner to the header subassembly and/or the liquid-cooled cold plates. The tubes are preconfigured for a particular electronic subsystem to facilitate installation of the monolithic structure in engaging relation with the electronic subsystem.

As shown in FIG. 5, header subassembly 550 includes two liquid manifolds, i.e., a coolant supply header 552 and a coolant return header 554, which in one embodiment, are coupled together via supporting brackets. In the monolithic cooling structure of FIG. 5, the coolant supply header 552 is metallurgically bonded and in fluid communication to each coolant supply tube 540, while the coolant return header 554 is metallurgically bonded and in fluid communication to each coolant return tube 542. A single coolant inlet and a single coolant outlet extend from the header subassembly for coupling through SAP-equipped multilayer hoses 551, 553 (coolant supply and return, respectively) to the electronic rack's coolant supply and return manifolds 642, 631 (shown in FIG. 6). The SAP-equipped multilayer hoses 551, 553 shown in FIGS. 5 and 6 may correspond with the SAP-equipped multilayer hose 300 shown in FIG. 3.

Figure 6:
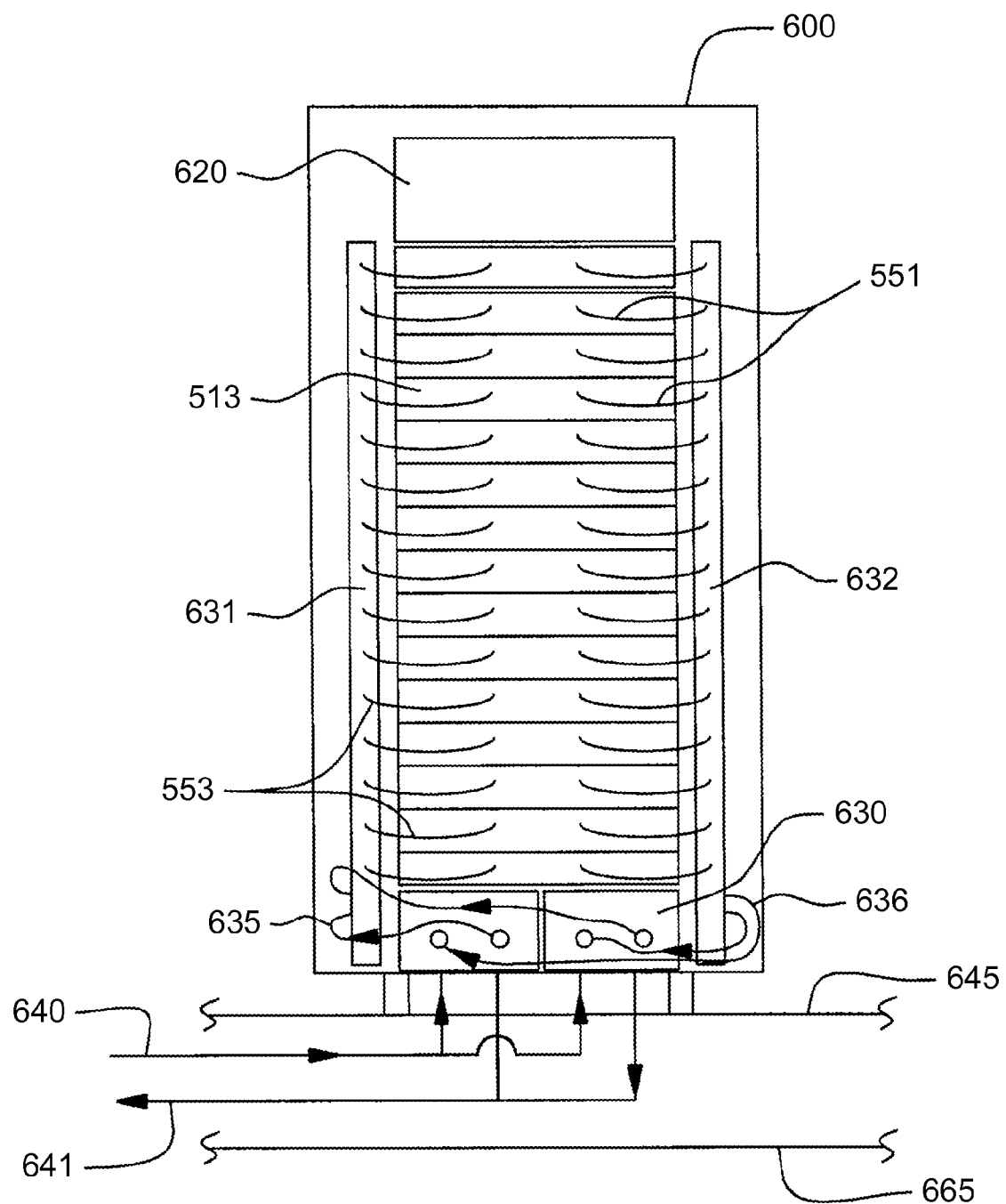
FIG. 6 is a front elevational view of a liquid-cooled electronics rack comprising multiple electronic subsystems of FIG. 5, wherein coolant supply and return headers and coolant supply and return manifolds are interconnected through coolant supply and return multilayer hoses each with a leak preventative interfacial layer containing a SAP according to some embodiments of the present invention.

FIG. 6 is a front elevational view of a liquid-cooled electronics rack 600 comprising multiple electronic subsystems of FIG. 5, wherein coolant supply and return headers and coolant supply and return manifolds are interconnected through coolant supply and return multilayer hoses 551, 553 each with a leak preventative interfacial layer containing a SAP according to some embodiments of the present invention. In this embodiment, the liquid-cooled electronics rack 600 comprises a plurality of electronic subsystems 513, which are (in one embodiment) processor or server nodes. A bulk power regulator 620 is shown disposed at an upper portion of the liquid-cooled electronics rack 600, and two modular cooling units (MCUs) 630 are disposed in a lower portion of the liquid-cooled electronics rack. In the embodiment described below, the coolant is assumed to be water or an aqueous-based solution, again, by way of example.

In addition to MCUs 630, the cooling apparatus includes a system water supply manifold 631, a system water return manifold 632, and manifold-to-node fluid connect SAP-equipped multilayer hoses 553 coupling system water supply manifold 631 to electronic subsystems 513, and node-to-manifold fluid connect SAP-equipped multilayer hoses 551 coupling the individual electronic subsystems 513 to the system water return manifold 632. Each MCU 630 is in fluid communication with system water supply manifold 631 via a respective system water supply hose 635, and each MCU 630 is in fluid communication with system water return manifold 632 via a respective system water return hose 636. The system water supply hose 635 and/or the system water return hose 636 may be SAP-equipped multilayer hoses.

As illustrated, heat load of the electronic subsystems is transferred (via a liquid-to-liquid heat exchanger (not shown) in each of the MCUs 630) from the system water to cooler facility water supplied by facility water supply line 640 and facility water return line 641 disposed, in the illustrated embodiment, in the space between a raised floor 645 and a base floor 665.

One skilled in the art will appreciate that many variations are possible within the scope of the present invention. For example, the SAP-equipped multilayer hose in accordance with some embodiments of the present invention may be utilized in applications beyond a cooling apparatus that removes heat from one or more electronic components in industries such as: the automotive industry (for applications such as interconnecting components for engine cooling); the food and beverage industry (for applications such as beverage dispensing/vending); and the building industry (for applications such as piping or re-piping in residential and commercial buildings). Thus, while the present invention has been particularly shown and described with reference to particular embodiments thereof, it will be understood by those skilled in the art that these and other changes in form and detail may be made therein without departing from the spirit and scope of the present invention.

What is claimed is:

1. A multilayer hose, comprising:
   an inner layer, wherein the inner layer comprises ethylene propylene diene monomer (M-class) (EPDM) rubber;
   an outer layer;
   an interfacial layer interposed between the inner layer and the outer layer, wherein the interfacial layer comprises a super absorbent polymer (SAP), wherein the SAP of the interfacial layer is covalently bonded to the inner layer via a curing reaction between the EPDM rubber of the inner layer and a vinyl functionalized reaction product of alginic acid and acryloyl chloride of the interfacial layer, and wherein the vinyl functionalized reaction product is alginate-acryloyl polymer.

2. The multilayer hose as recited in claim 1, wherein the outer layer comprises ethylene propylene diene monomer (M-class) (EPDM) rubber.

3. The multilayer hose as recited in claim 1, further comprising a reinforcement layer interposed between the inner layer and the outer layer.

4. The multilayer hose as recited in claim 3, wherein the reinforcement layer comprises textile filaments braided, knitted or spirally wound on the interfacial layer.

5. The multilayer hose as recited in claim 4, wherein the textile filaments are selected from a group consisting of nylons, polyethylene terephthalate (PET), rayon, and combinations thereof.

6. A multilayer hose, comprising:
   an inner layer, wherein the inner layer comprises ethylene propylene diene monomer (M-class) (EPDM) rubber;
   an interfacial layer on an outside surface of the inner layer, wherein the interfacial layer comprises a super absorbent polymer (SAP), wherein the SAP of the interfacial layer is covalently bonded to the inner layer via a curing reaction between the EPDM rubber of the inner layer and a vinyl functionalized reaction product of alginic acid and acryloyl chloride of the interfacial layer, and wherein the vinyl functionalized reaction product is alginate-acryloyl polymer;
   a reinforcement layer on the interfacial layer, wherein the reinforcement layer comprises textile filaments braided, knitted or spirally wound on the interfacial layer;
   an outer layer on the reinforcement layer, wherein the outer layer comprises ethylene propylene diene monomer (M-class) (EPDM) rubber.

7. A multilayer hose, comprising:

an inner layer, wherein the inner layer comprises ethylene propylene diene monomer (M-class) (EPDM) rubber;

an interfacial layer on an outside surface of the inner layer, wherein the interfacial layer comprises a super absorbent polymer (SAP), wherein the SAP of the interfacial layer is covalently bonded to the inner layer via a curing reaction between the EPDM rubber of the inner layer and a vinyl functionalized reaction product of alginic acid and acryloyl chloride of the interfacial layer, and wherein the vinyl functionalized reaction product is alginate-acryloyl polymer;

an outer layer on the interfacial layer, wherein the outer layer comprises ethylene propylene diene monomer (M-class) (EPDM) rubber.

* * * * *